USO10282005B2

United States Patent
Li et al.

(10) Patent No.: US 10,282,005 B2
(45) Date of Patent: May 7, 2019

(54) TOUCH DISPLAY PANEL, MANUFACTURING METHOD AND DETECTING METHOD FOR THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventors: Liangliang Li, Beijing (CN); Huibin Guo, Beijing (CN); Tsung Chieh Kuo, Beijing (CN); Xi Chen, Beijing (CN); Yuchun Feng, Beijing (CN); Shoukun Wang, Beijing (CN); Jing Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/314,161

(22) PCT Filed: Mar. 23, 2016

(86) PCT No.: PCT/CN2016/077057
§ 371 (c)(1),
(2) Date: Nov. 28, 2016

(87) PCT Pub. No.: WO2016/173340
PCT Pub. Date: Nov. 3, 2016

(65) Prior Publication Data
US 2017/0199605 A1 Jul. 13, 2017

(30) Foreign Application Priority Data
Apr. 27, 2015 (CN) .......................... 2015 1 0206073

(51) Int. Cl.
G06F 3/041 (2006.01)
G06F 3/045 (2006.01)
G06F 3/047 (2006.01)

(52) U.S. Cl.
CPC ............ G06F 3/0412 (2013.01); G06F 3/047 (2013.01); G06F 3/0416 (2013.01); G06F 2203/04103 (2013.01)

(58) Field of Classification Search
CPC ....... G06F 3/0412; G06F 3/044; G06F 3/0416
See application file for complete search history.

(56) References Cited

U.S. PATENT DOCUMENTS

2004/0169625 A1* 9/2004 Park ........................ G02F 1/135
345/87
2009/0289912 A1 11/2009 Chen et al.
(Continued)

FOREIGN PATENT DOCUMENTS

CN 102314248 A 1/2012
CN 102338948 A 2/2012
(Continued)

OTHER PUBLICATIONS

The First Chinese Office Action dated May 3, 2017; Appln. No. 201510206073.0.
(Continued)

*Primary Examiner* — Nan-Ying Yang
(74) *Attorney, Agent, or Firm* — Ladas & Parry LLP (57) ABSTRACT

A touch display panel, a manufacturing method thereof and a method of detecting a touch for the same are disclosed. The touch display panel includes a first substrate (01) and a second substrate (02). The first substrate (01) includes, within its non-display region, a plurality of gate lines (10) parallel to each other, a plurality of data lines (20) parallel to each other, a plurality of first touch electrode lines (30)
(Continued)

parallel to the gate lines (10), and a plurality of second touch electrode lines (40) parallel to the data lines (20). The first substrate (01) further includes first touch electrodes (50) electrically connected to the first touch electrode lines (30) and second touch electrodes (60) electrically connected to the second touch electrode lines (40). Between two adjacent data lines (20), there are two sub-pixels arranged in the same row on the first substrate (01). A second touch electrode line (40) is located between the two sub-pixels. A pair of gate lines (10) are located between any two adjacent rows of sub-pixels on the first substrate (01), and a first touch electrode lines (30) is located between the pair of the gate lines (10). Since the first touch electrode line (30) and the second touch electrode line (40) are disposed within the light-proof non-display region, their impact on the aperture ratio can be avoided.

19 Claims, 5 Drawing Sheets

(56) References Cited

U.S. PATENT DOCUMENTS

| | | | |
|---|---|---|---|
| 2011/0074712 A1 | 3/2011 | Bak et al. | |
| 2011/0310035 A1* | 12/2011 | Kim | G06F 3/0412 345/173 |
| 2014/0111473 A1 | 4/2014 | Yang et al. | |
| 2015/0261367 A1 | 9/2015 | Zhang et al. | |
| 2015/0268762 A1 | 9/2015 | Wang et al. | |

FOREIGN PATENT DOCUMENTS

| | | |
|---|---|---|
| CN | 102541335 A | 7/2012 |
| CN | 102937852 A | 2/2013 |
| CN | 102945106 A | 2/2013 |
| CN | 103279217 A | 9/2013 |
| CN | 103455202 A | 12/2013 |
| CN | 203397328 A | 1/2014 |
| CN | 202887152 A | 6/2014 |
| CN | 104765502 A | 7/2015 |

OTHER PUBLICATIONS

International Search Report and Written Opinion dated Jun. 23, 2016; PCT/CN2016/077057.
The Second Chinese Office Action dated Oct. 24, 2017; Appln. 201510206073.0.
The Third Chinese Office Action dated Apr. 28, 2018; Appln No. 201510206073.0.

* cited by examiner

TOUCH DISPLAY PANEL, MANUFACTURING METHOD AND DETECTING METHOD FOR THE SAME

TECHNICAL FIELD

The present invention relates to display field, more specifically, to a touch display panel, a manufacturing method and a detecting method for the same.

BACKGROUND

With the rapid development of display technology, touch panel (TP) has been produced and make people's life more convenience.

The touch panel comprises add-on touch panel and in-cell touch panel. In the in-cell touch panel, touch electrodes are integrated into the inside of the display panel, for example, disposed inside the array substrate of the display panel.

Figure 1:
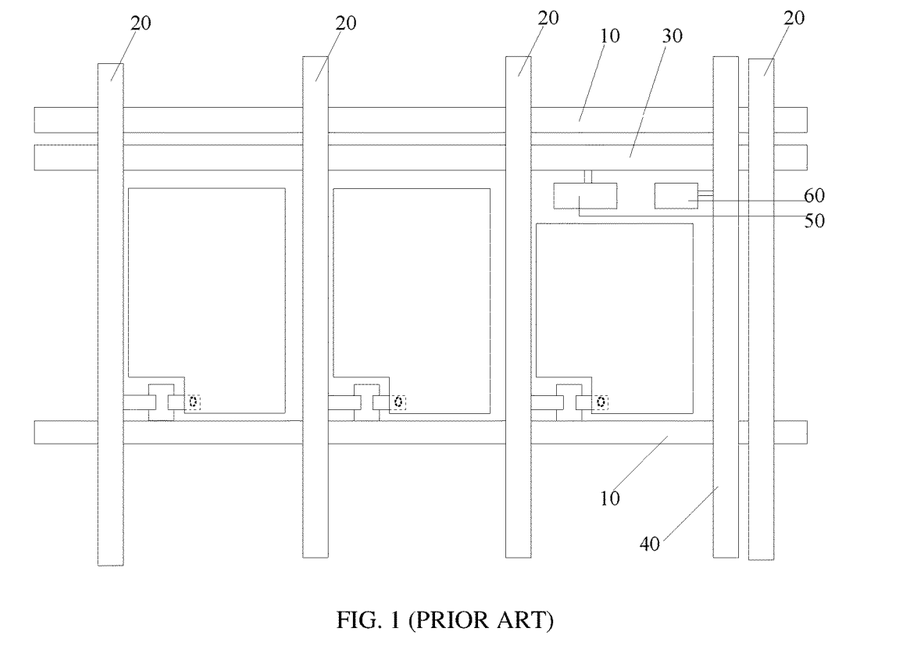
FIG. 1 schematically illustrates the touch electrodes and the touch electrode lines disposed on a known array substrate.

FIG. 1 illustrates an in-cell touch panel known in the art. The first touch electrode 50 is connected to the first touch electrode line 30, while the second touch electrode 60 is connected to the second touch electrode line 40. The first touch electrode line 30 and the second touch electrode line 40 are located in the light-transmissive region of the display region. Since the first touch electrode line 30 and the second touch electrode line 40 cover a portion of the light-transmissive area, the aperture ratio is decreased.

SUMMARY

A first aspect of the invention provides a touch display panel, which comprises a first substrate and a second substrate, wherein the first substrate comprises: a plurality of gate lines parallel to each other, a plurality of data lines parallel to each other, a plurality of first touch electrode lines parallel to the gate lines, and a plurality of second touch electrode lines parallel to the data lines, all of which are disposed within a non-display region, and comprises first touch electrodes electrically connected to the first touch electrode lines and second touch electrodes electrically connected to the second touch electrode line; wherein two sub-pixels arranged in a same row on the first substrate are disposed between every two adjacent data lines, and one of the second touch electrode lines is located between the two sub-pixels; wherein a pair of gate lines are located between any two adjacent rows of sub-pixels on the first substrate, and one of the first touch electrode lines is located between the pair of the gate lines.

A second aspect of the invention provides a method of manufacturing a touch display panel, the method comprises: forming a first substrate and forming a second substrate, wherein forming the first substrate comprises: forming a first substrate which includes a plurality of gate lines parallel to each other, a plurality of data lines parallel to each other, a plurality of first touch electrode lines parallel to the gate lines, and a plurality of second touch electrode lines parallel to the data lines, all of which are disposed within a non-display region, and further includes first touch electrodes electrically connected to the first touch electrode lines and second touch electrodes electrically connected to the second touch electrode lines; wherein two sub-pixels arranged in a same row on the first substrate are disposed between every two adjacent data lines, and one of the second touch electrode lines is located between the two sub-pixels; wherein a pair of gate lines are located between any two adjacent rows of sub-pixels on the first substrate, and one of the first touch electrode lines is located between the pair of the gate lines A third aspect of the invention provides a method of detecting a touch on the touch display panel of claim 1, comprising: applying a drive signal to the first transparent electrode on the second substrate during a touch operation; determining a coordinate of a touch point through variation of signals on the first touch electrode line electrically connected to the first touch electrode and on the second touch electrode line electrically connected to the second touch electrode on the first substrate.

A fourth aspect of the invention provides a method of detecting a touch on the touch display panel of claim 1, comprising: during a touch operation, applying a drive signal to one of the first touch electrode line electrically connected to the first touch electrode and the second touch electrode line electrically connected to the second touch electrode on the first substrate; determining a coordinate of a touch point through variations of signals on the first touch electrode line and on the second touch electrode line.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMBERS

01—first substrate; 02—second substrate; 10—gate line; 20—data line; 30—first touch electrode line; 40—second touch electrode line; 41—remaining pattern; 50—first touch electrode; 60—second touch electrode; 70—pixel electrode; 801—gate electrode; 802—source electrode; 803—drain electrode; 804—gate insulation layer; 805—semiconductor active layer; 90—auxiliary spacer; 100—first transparent electrode.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "comprises," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly.

Embodiments of the present invention provide a touch display panel, a manufacturing process thereof and a method of detecting a touch for the same. Since the first touch electrode line connected to the first touch electrode and the second touch electrode line connected to the second touch electrode are disposed within the light-proof non-display region, their impact on the aperture ratio could be avoided.

Figure 2:
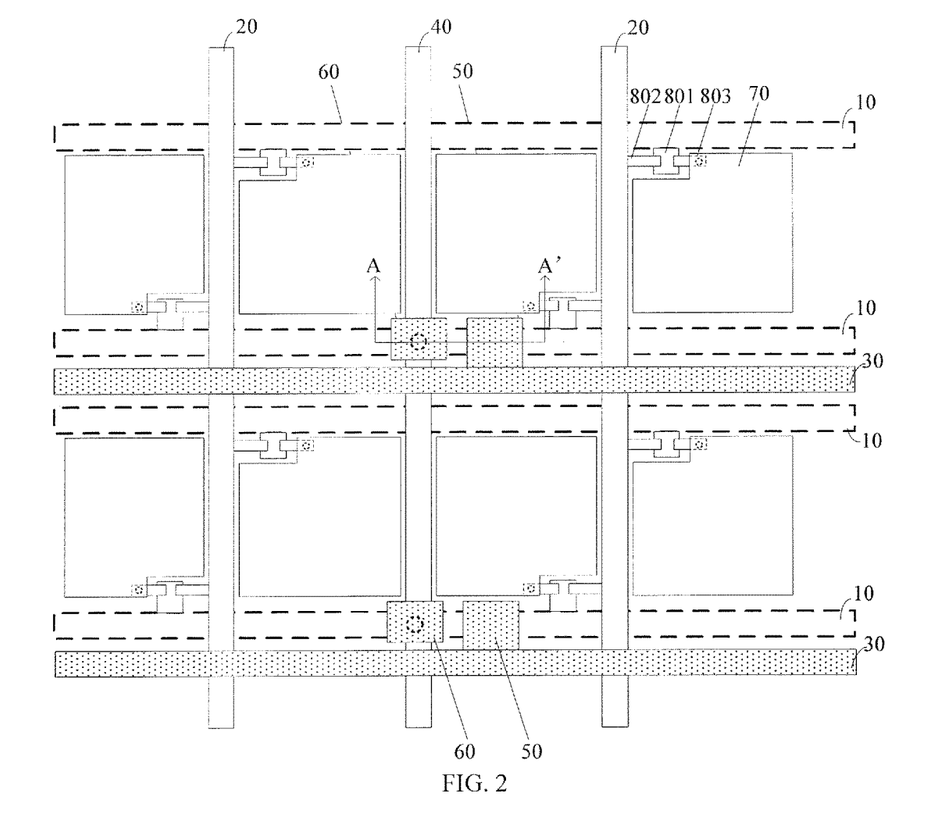
FIG. 2 schematically illustrates a first substrate in the touch display panel provided by an embodiments of the present invention.

As illustrated in FIG. 2, an embodiment of the present invention provides a touch display panel comprising a first substrate 01 and a second substrate 02. As illustrated in FIG. 2, the first substrate 01 comprises, within the non-display region, a plurality of gate lines 10 parallel to each other, a plurality of data lines 20 parallel to each other, a plurality of first touch electrode lines 30 parallel to the gate line 10, and a plurality of second touch electrode line 40 parallel to the data line 20. The first substrate 01 further comprises first touch electrodes 50 electrically connected to the first touch electrode lines 30 and second touch electrodes 60 electrically connected to the second touch electrode lines 40. Between two adjacent data lines 20, there are two sub-pixels arranged in the same row on the first substrate 01. The second touch electrode line 40 is located between the two sub-pixels. A pair of gate lines 10 are located between any two adjacent rows of sub-pixels on the first substrate 01, and the first touch electrode line 30 is located between the pair of the gate lines 10.

It is noted that, region of each sub-pixel on the touch display panel is light-transmissive, so the non-display region in the embodiments of the present invention refer to the light-proof region beyond the sub-pixels, for example, the regions between any two adjacent sub-pixels.

Each of the sub-pixels may, for example, comprise a thin film transistor. The thin film transistor comprises a gate electrode 801 electrically connected to the gate line 10, a gate insulation layer, a semiconductor active layer, a source electrode 802 connected to the data line 20 and a drain electrode 803 connected to the pixel electrode 70. The pixel electrode 70 herein may be electrically connected directly to the drain electrode 803, or electrically connected to the drain electrode 803 by a via hole.

Each of the first touch electrode lines 30 may connect a plurality of the first touch electrodes 50, and each of the second touch electrode lines 40 may connect a plurality of the second touch electrodes 60.

The positions of the first touch electrode 50 and the second touch electrode 60 illustrated in FIG. 2 is only for illustrative purpose. In other embodiments of the present invention, the aforesaid positions of the two electrodes are arranged to ensure the touch to be performed without any impact on normal display during the display stage. For example, the first touch electrode 50 and the second touch electrode 60 are light-transmissive electrodes.

The first touch electrode 50 and the second touch electrode 60 are insulated from each other, so that the first touch electrode line 30 electrically connected to the first touch electrode 50 and the second touch electrode line 40 electrically connected to the second touch electrode 60 are insulated from each other. For example, the first touch electrode lines 30 and the second touch electrode lines 40 are arranged in different layers.

The way, illustrated in FIG. 2, in which the first touch electrode 50 electrically connected to the first touch electrode line 30 and the second touch electrode 60 electrically connected to the second touch electrode line 40 is only for illustrative purpose. The person skilled in the art may adopt other ways of electrically connections as required.

The region of the sub-pixels on the touch display panel is relatively small while the contact area of the finger with the display panel is relative larger. Therefore, according to the touch precision, the second touch electrode line 40 may not be arranged between every two adjacent columns of sub-pixels. That is, the second touch electrode line 40 may be arranged for every few columns of sub-pixels. In an embodiment of the present invention, the second touch electrode line is arranged between every two adjacent columns of sub-pixels 40. Other arrangements could be determined according to actual condition and is not defined herein.

Likewise, one first touch electrode line 30 may also be arranged for every few rows of sub-pixels. In an embodiment of the present invention, one first touch electrode line 30 is arranged between every two adjacent rows of sub-pixels. Other arrangements could be determined according to actual condition and is not defined herein.

In the above embodiments, since the first touch electrode line 30 connected to the first touch electrode 50 and the second touch electrode line 40 connected to the second touch electrode 60 are disposed within the light-proof non-display region, their impact on the aperture ratio can be avoided.

Figure 3:
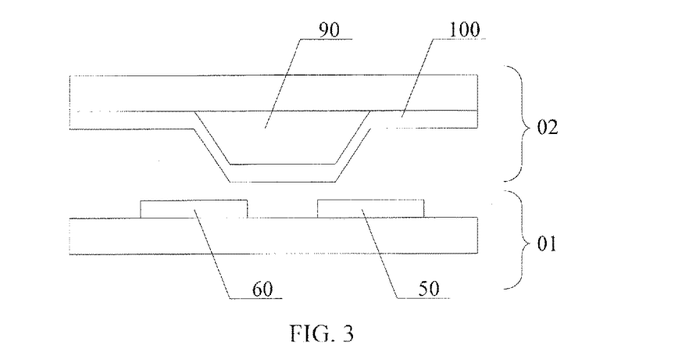
FIG. 3 schematically illustrates a touch display panel provided by embodiment of the present invention.

For example, as illustrated in FIG. 3, the first touch electrode 50 and the second touch electrode 60 are exposed on the surface of the first substrate 01. The top surfaces, far away from the base substrate of the first substrate 01, of the first touch electrode 50 and the second touch electrode 60 are in the same plane.

Herein, "the first touch electrode 50 and the second touch electrode 60 are exposed on the surface of the first substrate 01" refers to that the first touch electrode 50 and the second touch electrode 60 are disposed in the outermost layer of the first substrate 01.

It is noted that, "the top surfaces of the first touch electrode 50 and the second touch electrode 60 are in the same plane" not only comprises the situation where the whole top surface of the first touch electrode 50 and the whole top surface of the second touch electrode 60 are in the same plane, but also comprises the situation where portion of the top surface of the first touch electrode 50 and portion of the top surface of the second touch electrode 60 are disposed in the same plane.

As illustrated in FIG. 3, the second substrate 02 comprises, for example, an auxiliary spacer 90 and a first transparent electrode 100 covering the auxiliary spacer 90. The projection of the auxiliary spacer 90 on the first substrate 01 overlaps with the projections of the first touch electrode 50 and the second touch electrode 60 on the first substrate 01, and the first transparent electrode 100 covering the auxiliary spacer 90 is exposed on the surface of the second substrate 02.

As known to those skilled in the art, the spacer for keeping the cell gap typically comprises a main spacer and an auxiliary spacer. The main spacer adopted in the embodiments of the present invention may be arranged according to the prior art and is not defined herein. The first transparent electrode 100 may be, for example, an electrode disposed on the second substrate 02. Then, the first substrate 01 may further comprise, for example, a common electrode in addition to the pixel electrode 70. That is, as for the first substrate 01 used in In-Plane Switch (IPS) type LCD, the pixel electrode 70 and the common electrode are arranged alternatively in the same layer, and both of them are strip-shaped. As for the first substrate used in Advanced-super Dimensional Switching (ADS) type LCD, the pixel electrode 70 and the common electrode are arranged in different layers, wherein the upper one of them is a strip-shaped electrode and the lower one of them is a plate-shaped electrode. For example, the first transparent electrode 100 may be the common electrode.

In addition to the auxiliary spacer 90 and the first transparent electrode 100, the second substrate 02 may further comprise, for example, a black matrix and a color filter layer including red, green, blue etc. During the touch operation, due to the pressing of a finger, the first touch electrode 50 and the second touch electrode 60 are electrically connected to each other through the first transparent electrode 100 covering the auxiliary spacer 90. Thus, the position of the touch point could be determined by applying a drive signal to any one of the first transparent electrode 100, the first touch electrode 50 and the second touch electrode 60. In comparison with a known technology where the signal is applied on both the first touch electrode line and the second touch electrode line simultaneously, the embodiments of the present invention provides a more simple technical solution.

It is noted that, FIG. 3 schematically illustrates the first touch electrode 50 and the second touch electrode 60 which are disposed on the first substrate 01, but it does not mean that the first substrate 01 only comprises the first touch electrode 50 and the second touch electrode 60. Likewise, the auxiliary spacer 90 and the first transparent electrode 100 on the second substrate 02 are schematically illustrated, and it does not mean that the second substrate 02 only comprises the auxiliary spacer 90 and the first transparent electrode 100.

For example, the first touch electrode 50 and the second touch electrode 60 are located in the non-display region and arranged in the same layer.

Since the first touch electrode 50 and the second touch electrode 60 are located in the non-display region and thus do not occupy the light-transmissive area of sub-pixel region, the decrease of the aperture ratio could be avoided. Based on that, the first touch electrode 50 and the second touch electrode 60 are arranged in the same layer, i.e., the electrodes 50, 60 can be formed by a single patterning process, thereby avoiding the increase of the number of the patterning process.

For example, the first touch electrode 50 and the second touch electrode 60 are arranged in the same layer as the pixel electrode 40, and the pixel electrode 40 is located in the sub-pixel region of the first substrate 01.

Figure 4:
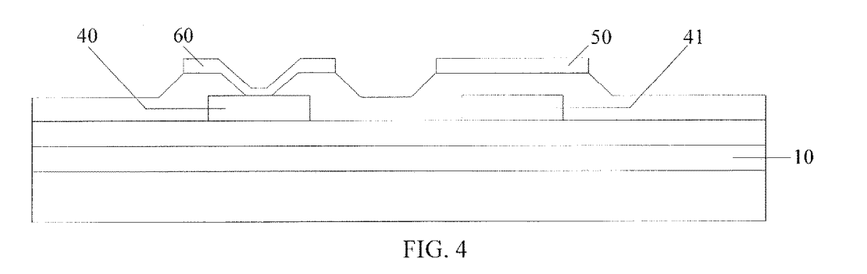
FIG. 4 is a sectional view taken along line AA' of FIG. 2.

For example, as illustrated in FIG. 2 and FIG. 4, the second touch electrode line 40 and the data line 20 are arranged in the same layer, and the second touch electrode 60 is electrically connected to the second touch electrode line 40 by a via hole. The first touch electrode line 30 and the first touch electrode 50 are arranged in the same layer. The first substrate 01 further comprises a remaining pattern 41 which is located below the first touch electrode 50 and in the same layer as the second touch electrode line 40.

The remaining pattern 41 herein is disposed so that the top surface of the first touch electrode 50 above it and the top surface of the second touch electrode 60 above the second touch electrode line 40 are arranged in the same plane. Thus, the first transparent electrode 100 can contact the first touch electrode 50 and the second touch electrode 60 due to the pressing of a finger during the touch operation.

In the Twisted-Nematic (TN) type liquid crystal display panel, the common electrode is located on the second substrate, so the first touch electrode 50 and the second touch electrode 60 are electrically connected to each other directly through the common electrode during the touch operation. Therefore, it is unnecessary to fabricate additional corresponding electrode to electrically connect the first touch electrode with the second touch electrode 60, and thus the structure is simplified.

An embodiment of the present invention further provides a method of manufacturing the touch display panel, which comprises: forming a first substrate 01 and a second substrate 02. As illustrated in FIG. 1, forming the first substrate 01 comprises: forming a first substrate 01 which comprises, within the non-display region, a plurality of gate lines 10 parallel to each other, a plurality of data lines 20 parallel to each other, a plurality of first touch electrode lines 30 parallel to the gate line 10, a plurality of second touch electrode line 40 parallel to the data line 20, first touch electrodes 50 electrically connected to the first touch electrode lines 30, and second touch electrodes 60 electrically connected to the second touch electrode lines 40. Between two adjacent data lines 20, there are two sub-pixels arranged in the same row on the first substrate 01. A second touch electrode line 40 is located between the two sub-pixels. A pair of gate lines 10 are located between adjacent two rows of sub-pixels on the first substrate 01, and the first touch electrode line 30 is located between a pair of the gate lines 10.

Since the first touch electrode line 30 electrically connected to the first touch electrode 50 and the second touch electrode line 40 electrically connected to the second touch electrode 60 are disposed within the light-proof non-display region, the embodiments of the present invention can avoid their impact on the aperture ratio in comparison with the known technology.

For example, as illustrated in FIG. 3, forming the second substrate 02 comprises forming a second substrate 02 which comprises an auxiliary spacer 90 and a first transparent electrode 100 covering the auxiliary spacer 90.

The projection of the auxiliary spacer 90 on the first substrate 01 overlaps with the projections of the first touch electrode 50 and the second touch electrode 60 on the first substrate 01, and the first transparent electrode 100 covering the auxiliary spacer 90 is exposed on the surface of the second substrate 02. In this case, the first touch electrode 50 and the second touch electrode 60 are also exposed on the surface of the first substrate 01. The top surfaces of the first touch electrode 50 and the second touch electrode 60 far away from the base substrate of first substrate 01 are in the same plane.

For example, the first touch electrode 50 and the second touch electrode 60 are formed in the non-display region and fabricated through a single patterning process.

Since the first touch electrode 50 and the second touch electrode 60 are located in the non-display region and thus do not occupy the light-transmissive area of sub-pixel region, the decrease of the aperture ratio could be avoided. Based on that, the increase of number of the patterning process can be avoided.

Furthermore, for example, the first touch electrode 50 and the second touch electrode 60 are fabricated with the pixel electrode 40 in the sub-pixel region of the first substrate 01 through a single patterning process.

For example, with reference to FIG. 2 and FIG. 4, a remaining pattern 41 below the first touch electrode 50 is further fabricated on the first substrate 01. The second touch electrode line 40, the remaining pattern 41 and the data line 20 are fabricated through a single patterning process, and the second touch electrode 60 is electrically connected to the second touch electrode line 40 by a via hole. The first touch electrode line 30 and the first touch electrode 50 are fabricated through a single patterning process.

Figure 5A:
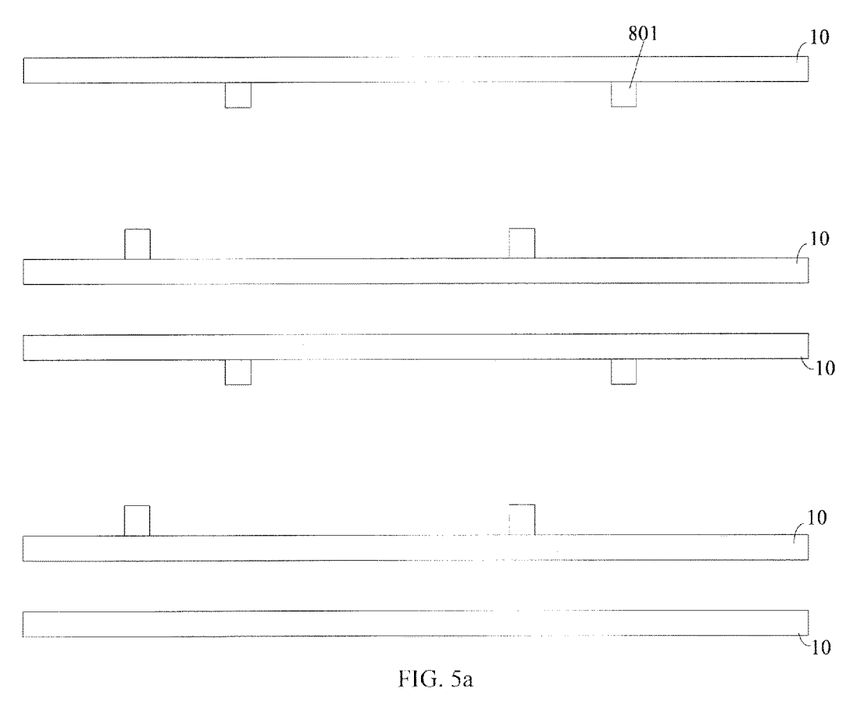
FIGS. 5a to 5c illustrate the process steps of manufacturing the first substrate in the touch display panel provided by an embodiment of the present invention.

The following provides an example of a method of manufacturing the first substrate 01, which comprises:

S01. As illustrated in FIG. 5*a*, fabricating a plurality of gate lines 10 and a plurality of pairs of gate electrodes 801 on the base substrate through a single patterning process, wherein each pair of the gate electrodes 801 are electrically connected to one of gate lines 10;

For example, a pair of gate lines 10 are fabricated between any two adjacent rows of sub-pixels to be formed on the first substrate 01.

Figure 5B:
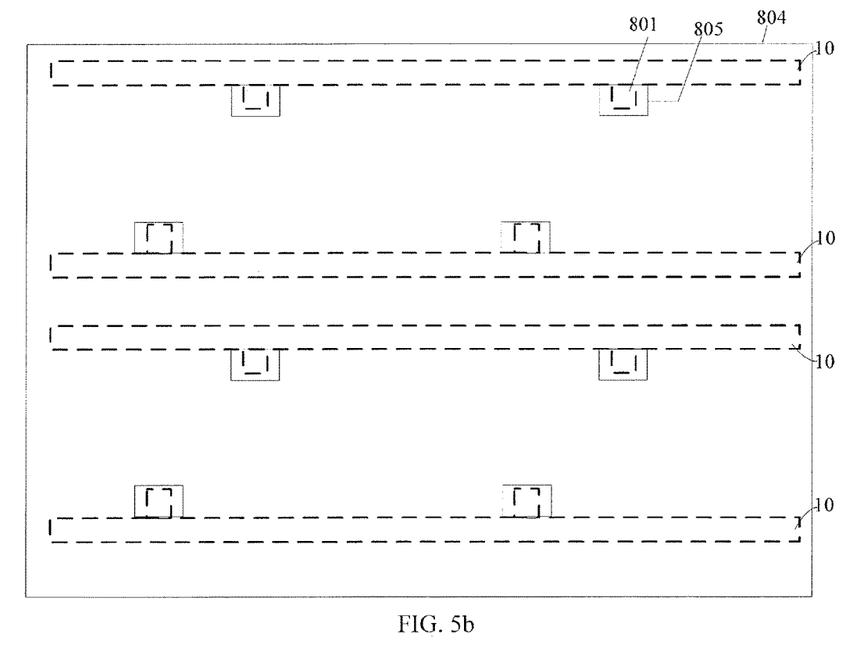

S02. As illustrated in FIG. 5*b*, on the basis of completing step S01, fabricating a gate insulation layer 804 and a semiconductor active layer 805.

Figure 5C:
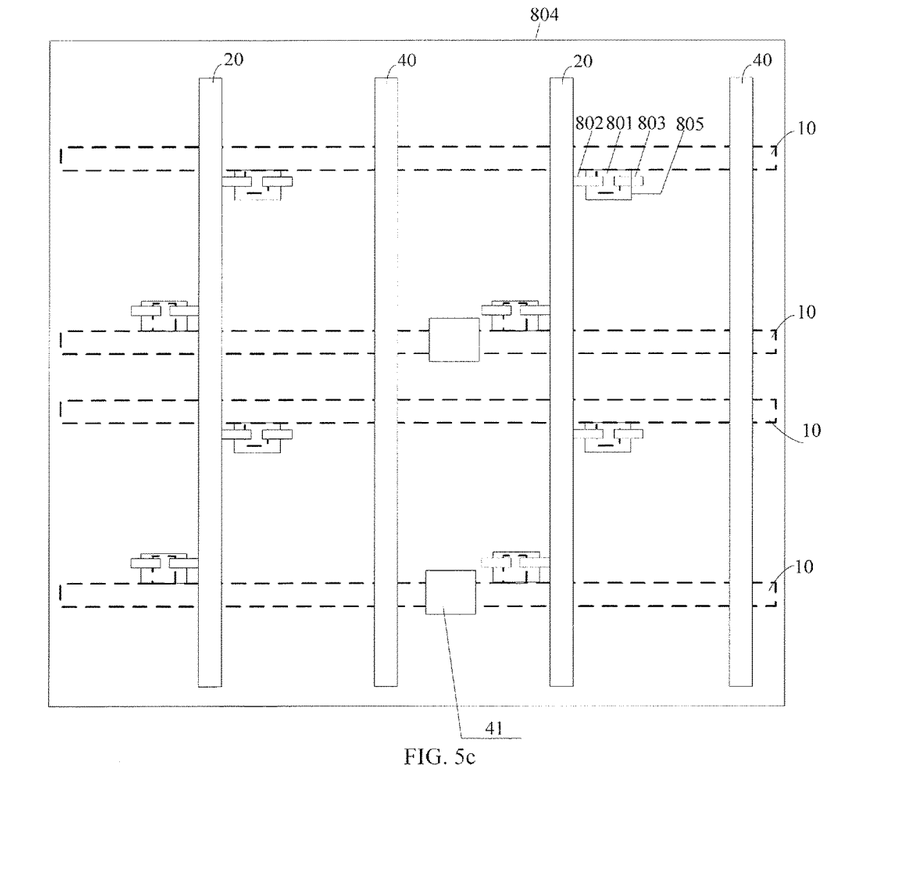

S03. As illustrated in FIG. 5*c*, on the basis of completing step S02, fabricating a data line 20, a source electrode 802 electrically connected to the data line 20, a drain electrode 803, a second touch electrode line 40 and a remaining pattern 41 through a single patterning process.

For example, in each of rows of the sub-pixels to be formed on the first substrate 01, there are two sub-pixels between two adjacent data lines 20 and arranged in the same row. A second touch electrode line 40 is located between the two sub-pixels. The remaining patter 41 is located below the first touch electrode 50 to be formed.

Herein, the second touch electrode line 40 may not be arranged between every two adjacent columns of sub-pixels. That is, the second touch electrode line 40 may be arranged for every few columns of sub-pixels. The second touch electrode line 40 may be distributed evenly on the base substrate at same intervals, or may be distributed on the base substrate at different intervals.

S04. As illustrated in FIG. 2, on the basis of completing step S03, fabricating a protective layer, and then fabricating first touch electrode lines 30, first touch electrodes 50 electrically connected to the first touch electrode lines 30, second touch electrodes 60 and pixel electrodes 70 on the protective layer.

For example, the protective layer comprises a first via hole exposing the drain electrode 803 and a second via hole exposing the second touch electrode line 40. The pixel electrode 70 is electrically connected to the drain electrode 803 through the first via hole, and the second touch electrode 60 is electrically connected to the second touch electrode line 40 through the second via hole.

The first touch electrode line 30 is arranged between every pair of the gate lines 10. However, the first touch electrode line 30 may also be arranged for a few rows of the sub-pixels. All of the first touch electrode lines 30 may be distributed evenly on the substrate at same intervals, or may be distributed on the substrate at different intervals.

As an example, the method of manufacturing the second substrate comprises: fabricating an auxiliary spacer 90 at the position corresponding to the first touch electrode 50 and the second touch electrode 60, and the projection of the auxiliary spacer 90 on the first substrate 01 overlaps with the projections of the first touch electrode 50 and the second touch electrode 60 on the first substrate 01; and then fabricating a transparent electrode.

An embodiment of the present invention further provides a method of detecting a touch on the touch display panel as illustrated in FIG. 2, and the method comprises: applying a drive signal to the first transparent electrode 100 on the second substrate 02 during the touch operation; determining the coordinate of the touch point through the variation of the signals on the first touch electrode line 30 and the second touch electrode line 40 of the first substrate 01, wherein the first touch electrode line 30 is electrically connected to the first touch electrode 50 and the second touch electrode line 40 electrically connected to the second touch electrode 60.

In the first substrate 01 according to the embodiments of the present invention, the first touch electrode 50 and the second touch electrode 60 are exposed on the surface of the first substrate 01. The top surfaces of the first touch electrode 50 and the second touch electrode 60 are in the same plane relative to the base substrate of the first substrate 01. The second substrate 02 comprises an auxiliary spacer 90 and a first transparent electrode 100 covering the auxiliary spacer 90. The projection of the auxiliary spacer 90 on the first substrate 01 overlaps with the projections of the first touch electrode 50 and the second touch electrode 60 on the first substrate 01, and the first touch electrode 50 covering the auxiliary spacer 90 is exposed on the surface of the second substrate 02.

During the touch operation, due to the pressing of a finger, the first touch electrode 50 and the second touch electrode 60 are connected to each other through the first transparent electrode 100 covering the auxiliary spacer 90. Therefore, when applying a drive signal to the first transparent electrode 100 on the second substrate 02, at the touch position, the signal on the first touch electrode line 30 electrically connected to the first touch electrode 50 and the signal on the second touch electrode line 40 electrically connected to the second touch electrode 60 are both varied correspondingly, and thus the coordinate can be determined.

An embodiment of the present invention further provide a method of detecting a touch on the touch display panel as illustrated in FIG. 2, comprising: during the touch operation, applying a drive signal to one of the first touch electrode line 30 electrically connected to the first touch electrode 50 and the second touch electrode line 40 electrically connected to the second touch electrode 60 on the first substrate 01; determining the coordinate of the touch point through the variation of the signals on the first touch electrode line 30 and the second touch electrode line 40.

In the first substrate 01 according to the embodiments of the present invention, the first touch electrode 50 and the second touch electrode 60 are exposed on the surface of the first substrate 01. The top surfaces of the first touch electrode 50 and the second touch electrode 60 are in the same plane relative to the base substrate of the first substrate 01. The second substrate 02 comprises an auxiliary spacer 90 and a first transparent electrode 100 covering the auxiliary spacer 90; The projection of the auxiliary spacer 90 on the first substrate 01 overlaps with the projections of the first touch electrode 50 and the second touch electrode 60 on the first substrate 01, and the first touch electrode 50 covering the auxiliary spacer 90 is exposed on the surface of the second substrate 02.

During the touch operation, due to the pressing of a finger, the first touch electrode 50 and the second touch electrode 60 are connected through the first transparent electrode 100 covering the auxiliary spacer 90. Therefore, when applying a drive signal to one of the first touch electrode line 30 and the second touch electrode line 40 on the first substrate 01, at the touch position, the signal on the other touch electrode line is also varied correspondingly, and thus the coordinate can be determined.

What is described above is related to the illustrative embodiments of the disclosure only and not limitative to the scope of the disclosure; the scopes of the disclosure are defined by the accompanying claims.

The present application claims the priority of Chinese patent application No. 201510206073.0 filed on Apr. 27, 2015, the disclosure of which is incorporated herein by reference in its entirety.

What is claimed is:

1. A touch display panel, comprising:
    a first substrate, comprising:
        a plurality of gate lines parallel to each other;
        a plurality of data lines parallel to each other;
        a plurality of first touch electrode lines parallel to the gate lines;
        a plurality of second touch electrode lines parallel to the data lines;
        first touch electrodes, electrically connected to the first touch electrode lines and arranged in a same layer as the first touch electrode lines;
        second touch electrodes, electrically connected to the second touch electrode lines;
        a plurality of sub-pixels, two sub-pixels being arranged in a same row and disposed between every two adjacent data lines, one of the second touch electrode lines being located between the two sub-pixels,
        a pair of gate lines being located between any two adjacent rows of sub-pixels, and one of the first touch electrode lines being located between the pair of the gate lines; and
        a remaining pattern, the remaining pattern and the second touch electrode lines being located on and in contact with a same interlayer, a top surface of the remaining pattern and a top surface of the second touch electrode lines are in a same plane.

2. The touch display panel of claim 1, wherein the second substrate comprises an auxiliary spacer and a first transparent electrode covering the auxiliary spacer;
    a projection of the auxiliary spacer on the first substrate overlaps with projections of the first touch electrode and the second touch electrode on the first substrate, and the first transparent electrode covering the auxiliary spacer is located in an outermost layer of the second substrate;
    the first touch electrode and the second touch electrode are located in an outermost layer of the first substrate, and top surfaces of the first touch electrode and of the second touch electrode which are far away from a base substrate of the first substrate are in a same plane.

3. The touch display panel of claim 2, wherein the first touch electrode and the second touch electrode are located in the non-display region and arranged in a same layer.

4. The touch display panel of claim 3, wherein the second touch electrode line and the data line are arranged in a same layer, and the second touch electrode is electrically connected to the second touch electrode line through a via hole.

5. The touch display panel of claim 3, wherein the first transparent electrode is a common electrode.

6. A method of manufacturing a touch display panel, comprising: forming a first substrate and forming a second substrate;
    wherein forming the first substrate comprises: forming a first substrate which comprises:
        a plurality of gate lines parallel to each other;
        a plurality of data lines parallel to each other;
        a plurality of first touch electrode lines parallel to the gate lines;
        a plurality of second touch electrode lines parallel to the data lines;
        first touch electrodes, electrically connected to the first touch electrode lines and arranged in a same layer as the first touch electrode lines;
        second touch electrodes, electrically connected to the second touch electrode lines;
        a plurality of sub-pixels, two sub-pixels being arranged in a same row and disposed between every two adjacent data lines, one of the second touch electrode lines being located between the two sub-pixels, a pair of gate lines being located between any two adjacent rows of sub-pixels, and one of the first touch electrode lines being located between the pair of the gate lines; and
        a remaining pattern, fabricated below the first touch electrodes,
        wherein the second touch electrode line, the remaining pattern and the data line are fabricated through a single patterning process, such that the remaining pattern and the second touch electrode line are located on and in contact with a same interlayer, and a top surface of the remaining pattern and a top surface of the second touch electrode lines are in a same plane,
        wherein the first touch electrode line and the first touch electrode are fabricated through a single patterning process.

7. The method of claim 6, wherein forming the second substrate comprises: forming a second substrate comprising an auxiliary spacer and a first transparent electrode covering the auxiliary spacer;
    wherein a projection of the auxiliary spacer on the first substrate overlaps with projections of the first touch electrode and the second touch electrode on the first substrate, and the first transparent electrode covering the auxiliary spacer is exposed on a surface of the second substrate;
    wherein the first touch electrode and the second touch electrode are exposed on a surface of the first substrate, and top surfaces of the first touch electrode and of the second touch electrode which are far away from a base substrate of the first substrate are in a same plane.

8. The method of claim 7, wherein the first touch electrode and the second touch electrode are formed in the non-display region and fabricated through a single patterning process.

9. The method of claim 8, wherein the second touch electrode is electrically connected to the second touch electrode line through a via hole.

10. The method of claim 8, wherein the first transparent electrode is a common electrode.

11. A method of detecting a touch on the touch display panel of claim 1, comprising:
    applying a drive signal to the first transparent electrode on the second substrate during a touch operation;

determining a coordinate of a touch point through variation of signals on the first touch electrode line electrically connected to the first touch electrode and on the second touch electrode line electrically connected to the second touch electrode on the first substrate.

12. A method of detecting a touch on the touch display panel of claim 1, comprising:
during a touch operation, applying a drive signal to one of the first touch electrode line electrically connected to the first touch electrode and the second touch electrode line electrically connected to the second touch electrode on the first substrate;
determining a coordinate of a touch point through variations of signals on the first touch electrode line and on the second touch electrode line.

13. The touch display panel of claim 1, wherein each first touch electrode line is non-overlapped with each first touch electrode along a direction perpendicular to a plane of the first substrate.

14. A touch display panel, comprising:
a first substrate, comprising:
a plurality of gate lines parallel to each other;
a plurality of data lines parallel to each other;
a plurality of first touch electrode lines parallel to the gate lines;
a plurality of second touch electrode lines parallel to the data lines;
first touch electrodes, electrically connected to the first touch electrode lines;
second touch electrodes, electrically connected to the second touch electrode lines, each first touch electrode and each second touch electrode overlapping with same one of the pair of gate lines along a direction perpendicular to a plane of the first substrate; and
a plurality of sub-pixels, two sub-pixels being arranged in a same row and disposed between every two adjacent data lines, one of the second touch electrode lines being located between the two sub-pixels,
a pair of gate lines being located between any two adjacent rows of sub-pixels on the first substrate, and one of the first touch electrode lines being located between the pair of the gate lines; and
a second substrate, disposed oppositely to the first substrate.

15. The touch display panel of claim 14, wherein the second substrate comprises an auxiliary spacer and a first transparent electrode covering the auxiliary spacer;
a projection of the auxiliary spacer on the first substrate overlaps with projections of the first touch electrode and the second touch electrode on the first substrate, and the first transparent electrode covering the auxiliary spacer is located in an outermost layer of the second substrate;
the first touch electrode and the second touch electrode are located in an outermost layer of the first substrate, and top surfaces of the first touch electrode and of the second touch electrode which are far away from a base substrate of the first substrate are in a same plane.

16. The touch display panel of claim 15, wherein the first touch electrode and the second touch electrode are located in the non-display region and arranged in a same layer.

17. The touch display panel of claim 16, wherein the second touch electrode line and the data line are arranged in a same layer, and the second touch electrode is electrically connected to the second touch electrode line through a via hole.

18. The touch display panel of claim 16, wherein the first transparent electrode is a common electrode.

19. The touch display panel of claim 13, wherein the second electrode lines overlaps with the same gate line along a direction perpendicular to the plane of the first substrate.

* * * * *